Figure 1:
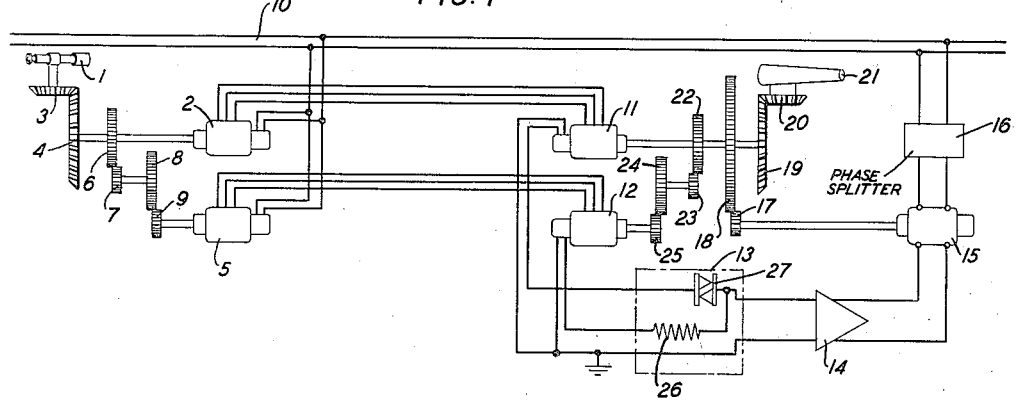

March 15, 1949.            E. B. FERRELL                2,464,566
                       POSITION CONTROL SYSTEM
                         Filed Jan. 26, 1944

INVENTOR
E. B. FERRELL
BY *W. R. Dawson*

ATTORNEY

Patented Mar. 15, 1949

2,464,566

UNITED STATES PATENT OFFICE 2,464,566

POSITION CONTROL SYSTEM

Enoch B. Ferrell, Chatham, N. J., assignor to Bell Telephone Laboratories, Incorporated, New York, N. Y., a corporation of New York Application January 26, 1944, Serial No. 519,777

3 Claims. (Cl. 318—30)

This invention relates to position control systems, particularly to systems in which the position of an object is controlled by coarse and fine control means.

The invention is specifically disclosed in a follow-up system in which a motor is controlled by a control circuit and coarse and fine means activate the control circuit.

The object of the invention is the provision of a passive network permitting the coarse and fine means to conjointly activate the control circuit, the effect of the coarse means predominating when the positional disagreement of the system exceeds a certain value.

A feature of the invention is a non-linear resistor connected so as to increase the range of amplitudes of the voltage from the coarse control means.

Another feature of the invention is a non-linear resistor connected so as to reduce the range of amplitudes of the voltage from the fine control means.

In one typical embodiment of the invention, a single non-linear resistor functions to produce both of the above features.

In the drawings:

Fig. 1 discloses a system embodying one form of the invention; and

Figure 2:
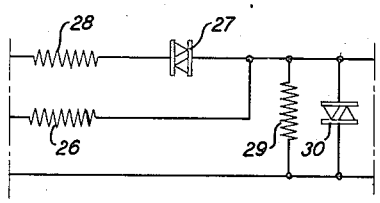

Fig. 2 shows an alternative form of network.

In Fig. 1 a controlling device 1, such as an optical observing instrument or other device, drives a coarse synchronous transmitter 2 through gears 3, 4, and also drives a fine synchronous transmitter 5 through gears 6, 7, 8, 9. The transmitters 2, 5 are excited by some convenient alternating power supply 10. The synchronous transmitters 2, 5 are the known transmitters having wound rotors and complete stator windings connected to form a plurality of phase windings. The phase windings of transmitters 2, 5 are respectively connected to the phase windings of the similar coarse 11, and fine 12, synchronous receivers. The rotors of the coarse 11 and fine 12 receivers are connected through the network 13 and amplifier 14 to one phase winding of the two-phase motor 15. The other phase winding of motor 15 is connected through the usual phase shifting network 16 to the supply 10. While for convenience, a two-phase motor is shown, the invention is not limited to the use of this type of motor and any other type of motor or power device may be used with appropriate changes in the control circuit.

The motor 15, through gears 17, 18, drives the rotor of the coarse receiver 11, and through gears 19, 20 drives the controlled object 21, which may be, for example, a gun, radio antenna or any other device. The motor 15, through gears 22, 23, 24, 25 also drives the rotor of the fine receiver 12.

The gear ratios may be selected so that the angular movement of the rotors of the coarse transmitter and receiver is in any desired ratio, including equality, to the angular movement of the controlling device and controlled object. The ratio of the angular movement of the fine transmitter and receiver to the angular movement of the coarse transmitter and receiver is usually between 10 and 100.

The rotor of the fine receiver 12 is connected through a resistor 26 to the input circuit of the amplifier 14. The rotor of the coarse receiver 11 is also connected through a non-linear resistor 27 to the input circuit of the control circuit 14.

The non-linear resistor 27 may conveniently comprise a plurality of discs of ceramic material containing crushed silicon carbide, as shown in United States Patent 1,822,742, September 8, 1931, K. B. McEachron, copper-copper oxide couples, or other substances in which the resistance of the substance decrease with increasing applied voltage.

As the non-linear resistor 27 is in series with the rotor of the coarse receiver 11, the effect of the non-linearity of the characteristic of this resistor is to expand the range of the amplitude variations of the voltage from the coarse receiver 11. The non-linear resistor 27 in series with the rotor of the coarse receiver 11 is also in parallel with resistor 26 and the rotor of the fine receiver 12. The effect of the non-linearity of the characteristic of resistor 27 is to compress the range of the amplitude variations of the voltage from the fine receiver 12. The characteristic of the non-linear resistance 27 and the resistance of resistor 26 are so chosen that the sum of the voltages supplied to the input of the control circuit 14 does not fall to zero at any point except the correct balance point, that is, no false zero voltages are produced.

The first minimum of the combined voltages before the true zero is found to be about 215 degrees of the fine receiver. Let the ratio of the fine receiver and transmitter to the coarse receiver and transmitter be $n$, that is, the fine rotors make $n$ revolutions to one revolution of the coarse rotors, and the maximum voltage generated be say 45 volts. Then at 215 degrees, the fine generated voltage will be 45 sine 215 degrees=—25.8 volts. At 215 degrees the coarse angle is $$\frac{215}{n}$$

degrees or $$\frac{215}{n} \times \frac{\pi}{180}$$

radians. Thus the coarse generated voltage is $$\frac{168}{n}$$

volts. For a reasonable margin of safety, the first minimum should not be too close to the zero voltage, so this minimum may be say one-third of the coarse voltage, or $$\frac{56}{n}$$

volts. The coarse generated voltage thus is divided into a voltage drop $$\frac{112}{n}$$

volts across resistor 27, and a voltage drop $$\frac{56}{n}$$

volts across the input of the control circuit 14. The fine generated voltage is divided into a voltage drop of $$-\left(25.8 + \frac{56}{n}\right)$$

volts across resistor 26, and a voltage drop of $$\frac{56}{n}$$

volts across the input of the amplifier 14.

The amplifier 14 is usually designed to have an input of fairly high impedance and will not draw any appreciable current, thus, the same current flows in the resistors 26 and 27. Then, the resistance of resistor 26 is to the resistance of resistor 27 at $$\frac{112}{n}$$

volts as $$\frac{25.8 + 56/n}{112/n}$$

or $0.5 + 0.23n$.

The permissible error of synchronous receivers is about 2 degrees of the fine receiver, or $0.035/n$ radians of the coarse receiver. To make the angular error dependent principally on the fine receiver, in this range, the resistance of resistor 27 preferably should be at least as large as the resistance of resistor 26.

For 2 degrees away from the true zero, the voltage from the fine receiver is 45 sine 2 degrees = 1.6 volts, and the voltage from the coarse receiver is $$\frac{1.6}{n}$$

volts. The voltage drop in resistors 26 and 27 will be $$0.8\left(1 - \frac{1}{n}\right)$$

volts and the voltage supplied to the amplifier 14 will be $$0.8\left(1 + \frac{1}{n}\right)$$

As $n$ is usually larger than 10, $$\frac{1}{n}$$

may be ignored.

Thus, the ratio of the resistance of resistor 27 at 0.8 volts to the resistance of resistor 27 at $$\frac{112}{n}$$

volts should not be less than $0.5 + 0.23n$. Similarly, the ratio of the current flowing in resistor 27 at $112/n$ volts to the current at 0.8 volts should not be less than $$32 + \frac{70}{n}$$

In some cases, difficulty may be experienced in selecting a commercial size of resistor to perform the functions of resistor 27. In such cases, the network of Fig. 2 may be used. In this network, a linear resistor 28 is connected in serial relationship with the non-linear resistor 27. A second non-linear resistor 30, which may be connected in parallel with a linear resistor 29, is connected across the input to the amplifier 14.

What is claimed is:

1. In a follow-up system for driving an object into positional agreement with a device, an electric motor for driving said object, means for controlling the supply of power to said motor having an output circuit connected to said motor and an input circuit, coarse and fine receivers controlled in response to positional disagreement between said object and said device to produce voltages related to the magnitude of said disagreement, a non-linear resistor connected in serial relationship from said coarse receiver to said input circuit and a linear resistor connected in serial relationship from said fine receiver to said input circuit.

2. The system of claim 1 in which the resistance of the linear resistor is not substantially less than the resistance of the non-linear resistance when the system is near positional agreement.

3. The system of claim 1, wherein the combined voltages of the coarse and fine receivers, before reaching positional agreement, pass through a minimum which is to have a predetermined margin of voltage above zero, and the fine receiver has a maximum permitted voltage error at positional agreement, in which the resistances of the non-linear resistor at positional agreement and at said minimum are in the ratio of the sum of the margin and the voltage of the fine receiver at said minimum to the excess over said margin of the voltage of the coarse receiver at said minimum, and the currents through said non-linear resistor at said minimum and at positional agreement are in the ratio of the sum of the margin and the voltage of the fine receiver at said minimum to one-half said voltage error.

ENOCH B. FERRELL.

REFERENCES CITED

The following references are of record in the file of this patent:

UNITED STATES PATENTS

| Number | Name | Date |
|---|---|---|
| 1,985,982 | Edwards | Jan. 1, 1935 |
| 2,194,170 | Newell | Mar. 19, 1940 |
| 2,414,384 | Moseley | Jan. 14, 1947 |

FOREIGN PATENTS

| Number | Country | Date |
|---|---|---|
| 373,253 | Italy | July 22, 1939 |